US012706104B2

(12) United States Patent
Cui et al.

(10) Patent No.: US 12,706,104 B2
(45) Date of Patent: Aug. 11, 2026

(54) ROBUST AUTHENTICATION OF DIGITAL AUDIO

(71) Applicant: Microsoft Technology Licensing, LLC, Redmond, WA (US)

(72) Inventors: Yang Cui, Beijing (CN); Ke Wang, Beijing (CN); Lei He, Beijing (CN); Frank Kao-Ping Soong, Beijing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 168 days.

(21) Appl. No.: 18/556,346

(22) PCT Filed: May 8, 2021

(86) PCT No.: PCT/CN2021/092281

§ 371 (c)(1),
(2) Date: Oct. 19, 2023

(87) PCT Pub. No.: WO2022/236451

PCT Pub. Date: Nov. 17, 2022

(65) Prior Publication Data

US 2024/0203431 A1 Jun. 20, 2024

(51) Int. Cl.
*G10L 19/018* (2013.01)
*G10L 25/51* (2013.01)

(52) U.S. Cl.
CPC ............ *G10L 19/018* (2013.01); *G10L 25/51* (2013.01)

(58) Field of Classification Search
CPC .................. G10L 15/063; G10L 15/22; G10L 2015/0635; G10L 2015/223; G06F 40/20
See application file for complete search history.

(56) References Cited

U.S. PATENT DOCUMENTS

2005/0055214 A1 3/2005 Kirovski et al.
2006/0239502 A1* 10/2006 Petrovic ............ H04N 1/32245 380/54

(Continued)

FOREIGN PATENT DOCUMENTS

CN 101290773 A 10/2008
CN 102222504 A 10/2011

(Continued)

OTHER PUBLICATIONS

Xiang, Yong, Iynkaran Natgunanathan, Song Guo, Wanlei Zhou, and Saeid Nahavandi. "Patchwork-based audio watermarking method robust to de-synchronization attacks." IEEE/ACM Transactions on Audio, Speech, and Language Processing 22, No. 9 (2014): 1413-1423 (Year: 2014).*

(Continued)

*Primary Examiner* — Daniel C Washburn
*Assistant Examiner* — Paul J. Mueller
(74) *Attorney, Agent, or Firm* — Foley IP Law, PLLC

(57) ABSTRACT

Solutions for authenticating digital audio include: generating a first band-limited watermark using a first key, generating a second band-limited watermark using a second key, wherein the bandwidth of the second watermark does not overlap with the bandwidth of the first watermark; and embedding the first watermark and the second watermark into a segment of the digital audio file. Solutions also include determining a first watermark score of a segment of the digital audio file for the first watermark using the first key; determining a second watermark score of the segment of the digital audio file for the second watermark using the second key; based on at least the first watermark score and the second watermark score, determining a probability that the digital audio file is watermarked; and generating a report indicating whether the digital audio file is watermarked. In some examples, solutions may also embed and decode messages.

12 Claims, 14 Drawing Sheets

(56) References Cited

U.S. PATENT DOCUMENTS

| | | | | |
|---|---|---|---|---|
| 2011/0144998 | A1 | 6/2011 | Grill | |
| 2012/0026393 | A1* | 2/2012 | Petrovic | H04H 20/31 348/E7.001 |
| 2020/0082805 | A1* | 3/2020 | Zhang | G10L 13/027 |

FOREIGN PATENT DOCUMENTS

| | | | | |
|---|---|---|---|---|
| CN | 112154501 | B | 12/2020 | |
| WO | 2006116270 | A2 | 11/2006 | |
| WO | WO-2019226802 | A1 * | 11/2019 | G10L 17/22 |

OTHER PUBLICATIONS

Hua, et al., "Twenty Years of Digital Audio Watermarking—A Comprehensive Review", In Journal of Signal processing, vol. 128, Nov. 1, 2016, pp. 1-63.

Kirovski, et al., "Spread-spectrum watermarking of audio signals", In Journal of IEEE transactions on signal processing, vol. 51, Issue 4, Apr. 2003, pp. 1020-1033.

Lin, et al., "Audio watermark", In Publication of Springer, May 22, 2015, 213 Pages.

Swanson, et al., "Robust audio watermarking using perceptual masking", In Journal of Signal processing, vol. 66, Issue 3, May 28, 1998, pp. 337-355.

Tai, et al., "Audio Watermarking over the Air with Modulated Self-correlation", In Proceedings of IEEE International Conference on Acoustics, Speech and Signal Processing, May 12, 2019, 5 Pages.

Communication pursuant to Rules 70(2) and 70a(2) received in European Application No. 21941035.4, mailed on Dec. 3, 2024, 1 Page.

Extended European Search Report Received for European Application No. 21941035.4, mailed on Nov. 14, 2024, 8 pages.

"International Search Report and Written Opinion Issued in PCT Application No. PCT/CN21/092281", Mailed Date: Feb. 9, 2022, 7 Pages.

First Office Action Received for Chinese Application No. 202180059403.1, mailed on Jun. 4, 2026, 14 pages. (English translation Provided).

* cited by examiner

ROBUST AUTHENTICATION OF DIGITAL AUDIO

BACKGROUND

Digital audio watermarking is a technique that is used to assist with enforcement of copyrights, and uses data hiding technology to embed messages within digital audio content that can later be recovered, but which hopefully cannot be heard by humans when listening to the audio. However, hackers and pirates are aware of the use of watermarking and so may attempt to tamper with a watermark in a digital audio file, such as by attempting to over-write it with a different watermark or copy the recording in a manner that erases or degrades the watermark. One method is playing the audio through a speaker, and recording the played audio into a different digital file. If a watermark is rendered unrecoverable, the intended authentication value for copyright enforcement may be reduced or lost.

Traditional methods of watermarking have multiple shortcomings: For example, multiple watermarks placed within the same segment of audio will interfere with each other, possibly rendering one of the watermarks unrecoverable (damaging the authentication value), and common techniques such as inserting bit sequences, often using lesser-significance bits, result in easily-damaged watermarks. The common trade-off with traditional methods of watermarking is that increasing robustness of authentication decreases transparency to the user, rendering the watermark potentially audible to humans and thereby degrading the user's listening experience.

SUMMARY

The disclosed examples are described in detail below with reference to the accompanying drawing figures listed below. The following summary is provided to illustrate some examples disclosed herein. It is not meant, however, to limit all examples to any particular configuration or sequence of operations.

Solutions for authenticating digital audio include: receiving a digital audio file; generating a first watermark using a first key, wherein the first watermark is band-limited to a first bandwidth; generating a second watermark using a second key, wherein the second watermark is band-limited to a second bandwidth, and wherein the second bandwidth does not overlap with the first bandwidth; embedding the first watermark into a segment of the digital audio file; and embedding the second watermark into the segment of the digital audio file.

Solutions for authenticating digital audio include: receiving a digital audio file; determining a first watermark score of a segment of the digital audio file for a first watermark using a first key, wherein the first watermark is band-limited to a first bandwidth; determining a second watermark score of the segment of the digital audio file for a second watermark using a second key, wherein the second watermark is band-limited to a second bandwidth, and wherein the second bandwidth does not overlap with the first bandwidth; based on at least the first watermark score and the second watermark score, determining a probability that the digital audio file is watermarked; and based on at least determining the probability that the digital audio file is watermarked, generating a report indicating whether the digital audio file is watermarked. In some examples, solutions for authenticating digital audio may also embed and decode messages.

BRIEF DESCRIPTION OF THE DRAWINGS

The disclosed examples are described in detail below with reference to the accompanying drawing figures listed below.

Corresponding reference characters indicate corresponding parts throughout the drawings.

DETAILED DESCRIPTION

Figure 1:
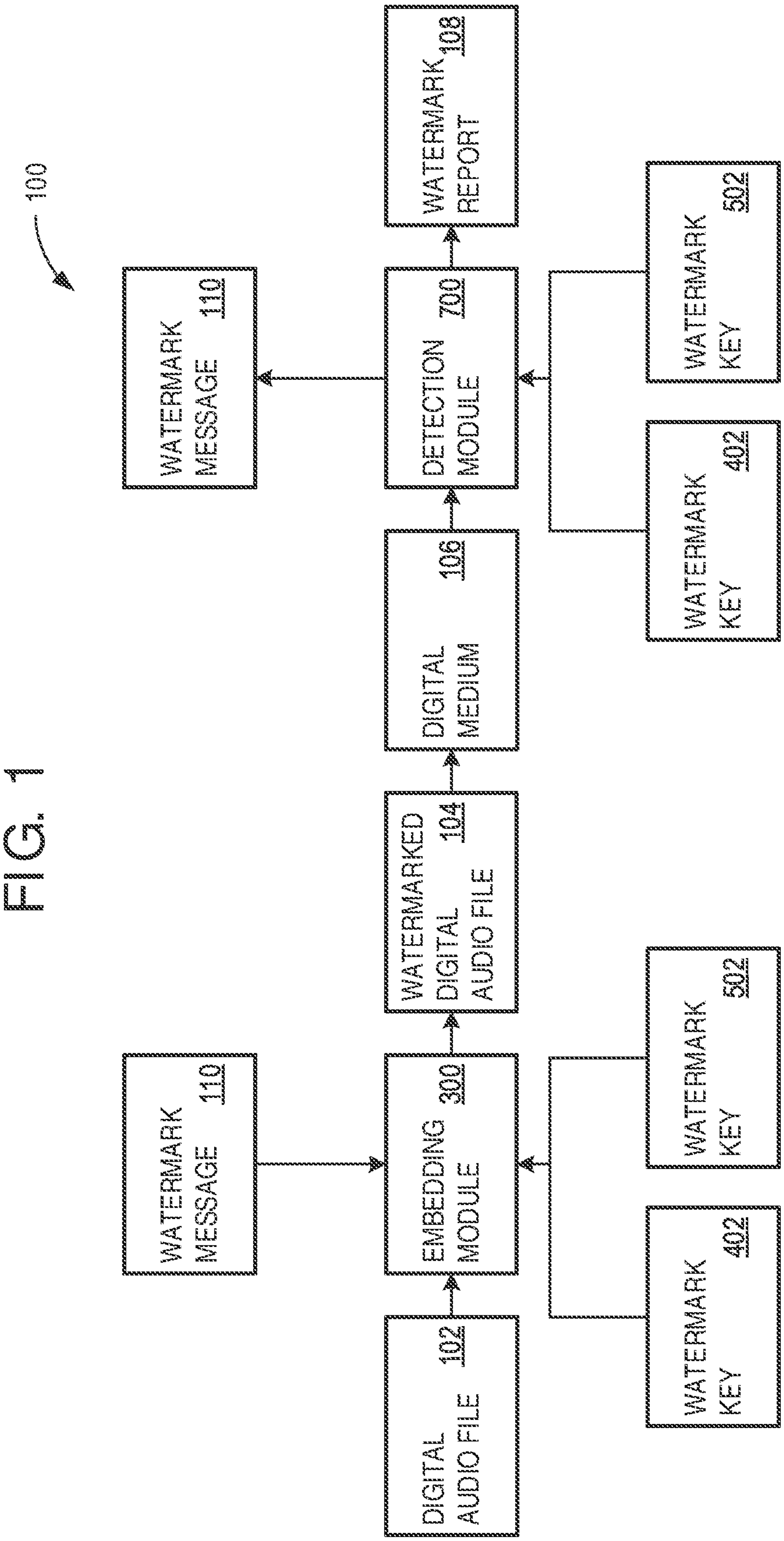
FIG. 1 illustrates an arrangement for robust authentication of digital audio.

The various examples will be described in detail with reference to the accompanying drawings. Wherever possible, the same reference numbers will be used throughout the drawings to refer to the same or like parts. References made throughout this disclosure relating to specific examples and implementations are provided solely for illustrative purposes but, unless indicated to the contrary, are not meant to limit all examples.

Solutions for authenticating digital audio include: generating a first band-limited watermark using a first key, generating a second band-limited watermark using a second key, wherein the bandwidth of the second watermark does not overlap with the bandwidth of the first watermark; and embedding the first watermark and the second watermark into a segment of the digital audio file. Solutions also include determining a first watermark score of a segment of the digital audio file for the first watermark using the first key; determining a second watermark score of the segment of the digital audio file for the second watermark using the second key; based on at least the first watermark score and the second watermark score, determining a probability that the digital audio file is watermarked; and generating a report indicating whether the digital audio file is watermarked. In some examples, solutions for authenticating digital audio may also embed and decode messages.

Aspects of the disclosure operate in an unconventional manner by embedding multiple (different) watermarks within the same segment of a digital audio file, placing the watermarks into their own limited bandwidths within the segment. This technique permits the watermarks to co-exist without interference, thereby improving robustness, such as resistance to tampering. Aspects of the disclosure operate in an unconventional manner by detecting the multiple watermarks within the different bands of the same segment of the digital audio file. This technique improves the reliability of detecting the watermarks, thereby also improving robustness of the detection process, in the event that tampering had occurred.

A disclosed solution for watermark embedding and detection employs a watermark embedding module and a watermark detection module. Watermark keys are employed to synchronize parameters and to provide extra security. In some examples, a machine learning (ML) component, using neural networks (NNs) is leveraged to enhance the robustness. By limiting the bandwidth of watermarks, multiple watermarks may be embedded into the same segment of digital audio without interference. The use of multiple different watermarking schemes within the same segment of digital audio improves the likelihood of detecting at least one of the watermarks, despite natural noise and distortion and even deliberate attacks (e.g., improves robustness). An example is disclosed that uses one bandwidth of 6 kilohertz (KHz) to 8 KHZ as the bandwidth for one watermark, and 3-4 KHZ as the second bandwidth for a second watermark.

Solutions may be used for audio books, music, and other classes of digital audio recordings in which imperceptibility (perceptual transparency) is important to users, such as for high quality audio. Versions have been tested and produced a mean opinion score (MOS) gap of less than 0.02 and a comparative (CMOS) gap of less than 0.05. Other advantages include low computational cost and low latency for real-time applications, and the flexibility to adjust to various sampling rates and quantization resolution. Watermark may be embedded into multiple digital audio formats, such as with sampling rates from 8 KHz to 48 KHz, quantization from 8-bits to 48 bits, and storage in WAV, PCM, OGG, MP3, OPUS. SILK. Siren, and other formats— including formats using lossy compression by codec.

Security is provided to be resistant to brute force cracking. For example, the use of two 96-bit keys is described, providing 2^96 bits of security. Robustness preserves performance against distortion or damage through transmission, replay and re-recording, noise, and even deliberate attacks. Versions have been tested successfully using nose levels ranging from −10 decibels (dB) up through 30 dB. Deliberate attacks that may be defeated by various examples of the disclosure include synchronization attacks, which adjust time sequential properties of the audio, such as making the time sequence faster or slower, swapping the order of some audio segments or inserting other audio segments; signal processing attacks, such as low-pass filtering or high-pass filtering; and the digital watermark attacks, which add new watermarks to attempt masking the original watermark(s). Robustness has been demonstrated to exceed 95% correct detections (combined precision and recall measurements) in real-world scenarios.

FIG. 1 illustrates an arrangement 100 for robust authentication of digital audio. A digital audio file 102 is passed through a watermark embedding module 300 to become a watermarked digital audio file 104. Watermarked digital audio file 104 is distributed and stored on a digital medium 106. Upon a need to identify a watermark, watermarked digital audio file 104 is passed through a watermark detection module 700, which outputs a watermark report 108 indicating the detection (or lack of detection) of a watermark. Watermark embedding module 300 uses a watermark key 402 to generate a first watermark and a watermark key 502 to generate a second watermark. Watermark detection module 700 uses watermark key 402 and watermark key 502 to detect the watermarks.

In some examples, a watermark message 110 is inserted into one of the watermarks for embedding into digital audio file 102 by watermark embedding module 300 and later extracted by watermark detection module 700. Watermark embedding module 300 is described in further detail in relation to FIG. 3. Watermark detection module 700 is described in further detail in relation to FIG. 7. Watermark keys 402 and 502 are described in further detail in relation to FIGS. 4 and 5, respectively.

In general, there are three requirements for the performance of digital audio watermarking. The first is imperceptibility, also known as perceptual transparency, which is a requirement to ensure that the watermark is not heard by human ears. The second is robustness, which is leveraged to measure the stability of the watermark against distortion or damage during transmission. The third is security, which refers to the complexity for brute cracking the digital watermark. In general, the longer the key length, the higher the complexity, and the more secure the watermark.

Multiple watermarking schemes exist, such as a spread spectrum method, which spreads a pseudo-random sequence spectrum and then embeds it into the audio; a patchwork method that embeds a watermark into two dual channels of a data block; a quantization index modulation (QIM); a perceptual method; and a self-correlated method. The perceptual method improves the imperceptibility of the watermark by calculating a psychoacoustic model, while enhancing the robustness. The self-correlated method divides the audio into several data blocks with equal length. For example, two blocks are used for embedding different watermark vectors that are mutually orthogonal in a discrete cosine transform (DCT) domain. For detection procedure, the existence of the watermark is estimated by calculating the self-correlation of the (watermarked) audio signal. The higher the correlation, the higher the probability of the self-correlated watermark being present.

Figure 2:
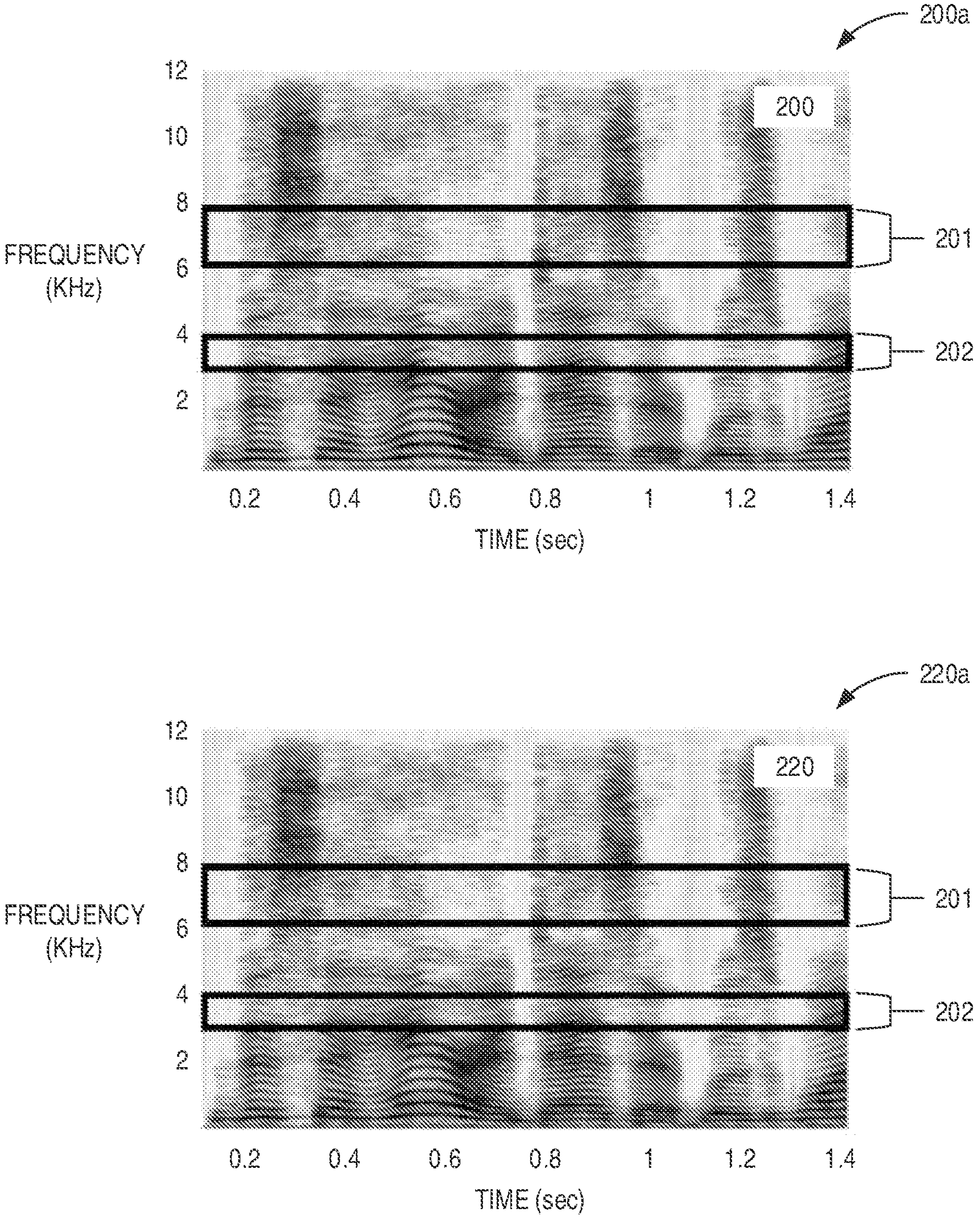
FIG. 2 illustrates a spectrogram of an input audio segment and a watermarked audio segment, as may be produced using the arrangement of FIG. 1.

FIG. 2 illustrates a spectrogram 200*a* of a digital audio file segment 200 and a spectrogram 220*a* of a watermarked digital audio file segment 220. In operation, digital audio file segment 200 is input to watermark embedding module 300, which outputs watermarked digital audio file segment 220. Digital audio file segment 200 is a 1.4 second portion of digital audio file 102 and watermarked digital audio file segment 220 is a 1.4 second portion of watermarked digital audio file 104. A first watermark (e.g., a spread spectrum watermark 410) occupies a first bandwidth 201, which is shown as 6-8 KHz, and a second watermark (e.g., a self-correlated watermark 510) occupies a second bandwidth 202, which is shown as 3-4 KHz. The as 6-8 KHz bandwidth of the first watermark does not overlap with the 3-4 KHz bandwidth of the second watermark. This permits both watermarks to co-exist in the same audio segment without interference. A careful examination of FIG. 2 reveals slight differences at approximately 0.6 seconds in bandwidth 202.

The self-correlated (SC) method is adopted in the lower frequency band (3-4 KHz) and is robust for reverberation scenes. The spread spectrum (SS) method is adopted in the higher frequency band (6-8 KHz) and is robust for additive noise scenes. The combination provides superior robustness over either used alone. In low frequencies, higher robustness may be achieved at the expense of imperceptibility, whereas in high frequencies, higher imperceptibility may be achieved at the expense of robustness. The self-correlated method is able to enhance imperceptibility at low frequencies. The spread spectrum method is able to enhance robustness at high frequencies. Spread spectrum watermark 410 is described in further detail in relation to FIG. 4, and self-correlated watermark 510 is described in further detail in relation to FIG. 5.

Figure 3:
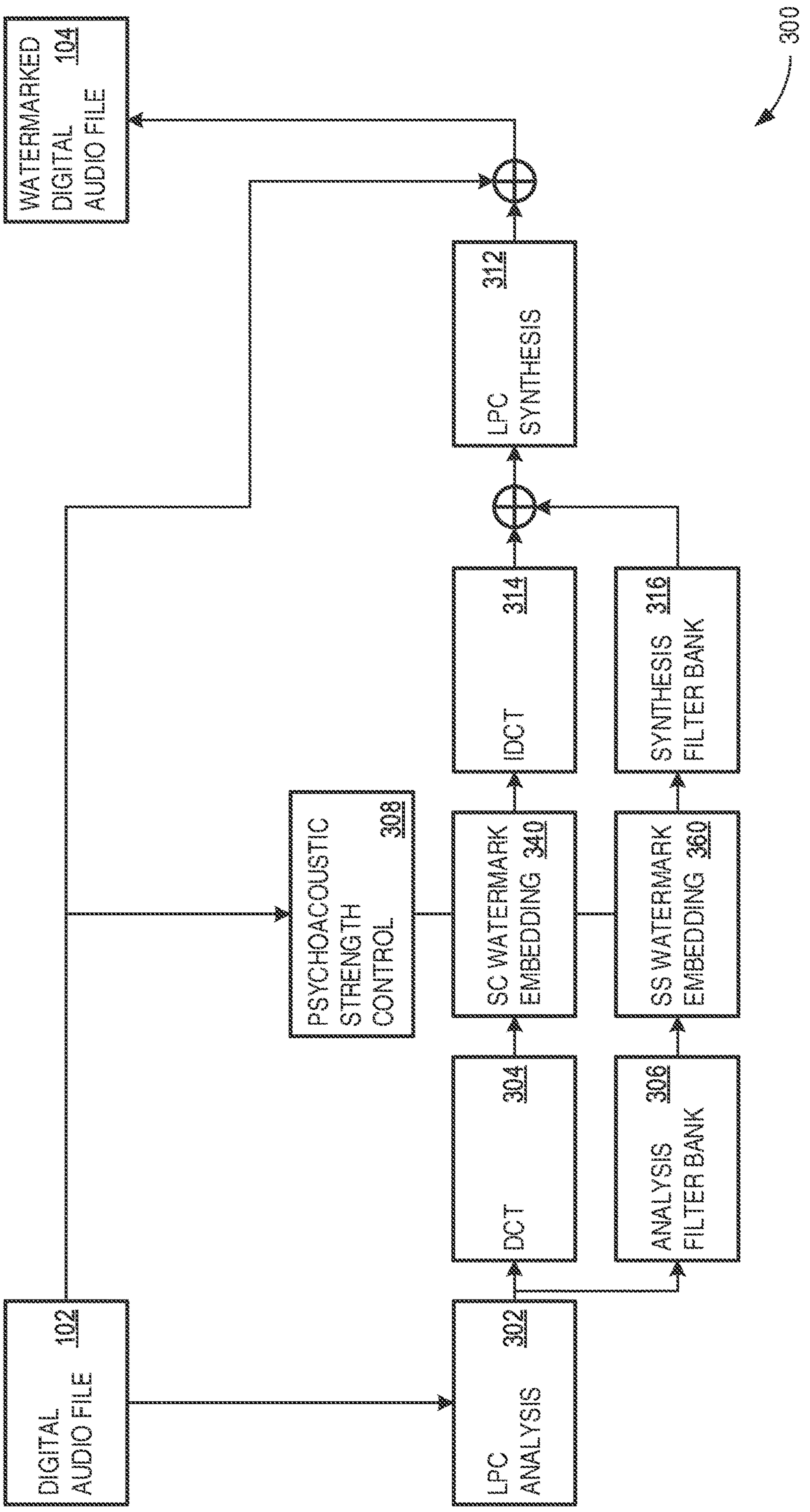
FIG. 3 illustrates further detail for the watermark embedding module of the arrangement of FIG. 1.

FIG. 3 illustrates further detail for watermark embedding module 300. Watermark embedding module 300 includes a linear predictive coding (LPC) analysis component 302 that receives digital audio file 102. LPC analysis is leveraged to decompose the audio signal into spectral envelope and excitation signal, and is used to improve the imperceptibility and enhances the robustness in LPC-based codec scenes. Watermark embedding module 300 then branches to embed both a self-correlated watermark and a spread spectrum watermark, although a different combination of watermarks may be used (including using additional watermarks in the same audio segment, in another non-overlapping bandwidth).

Figure 4:
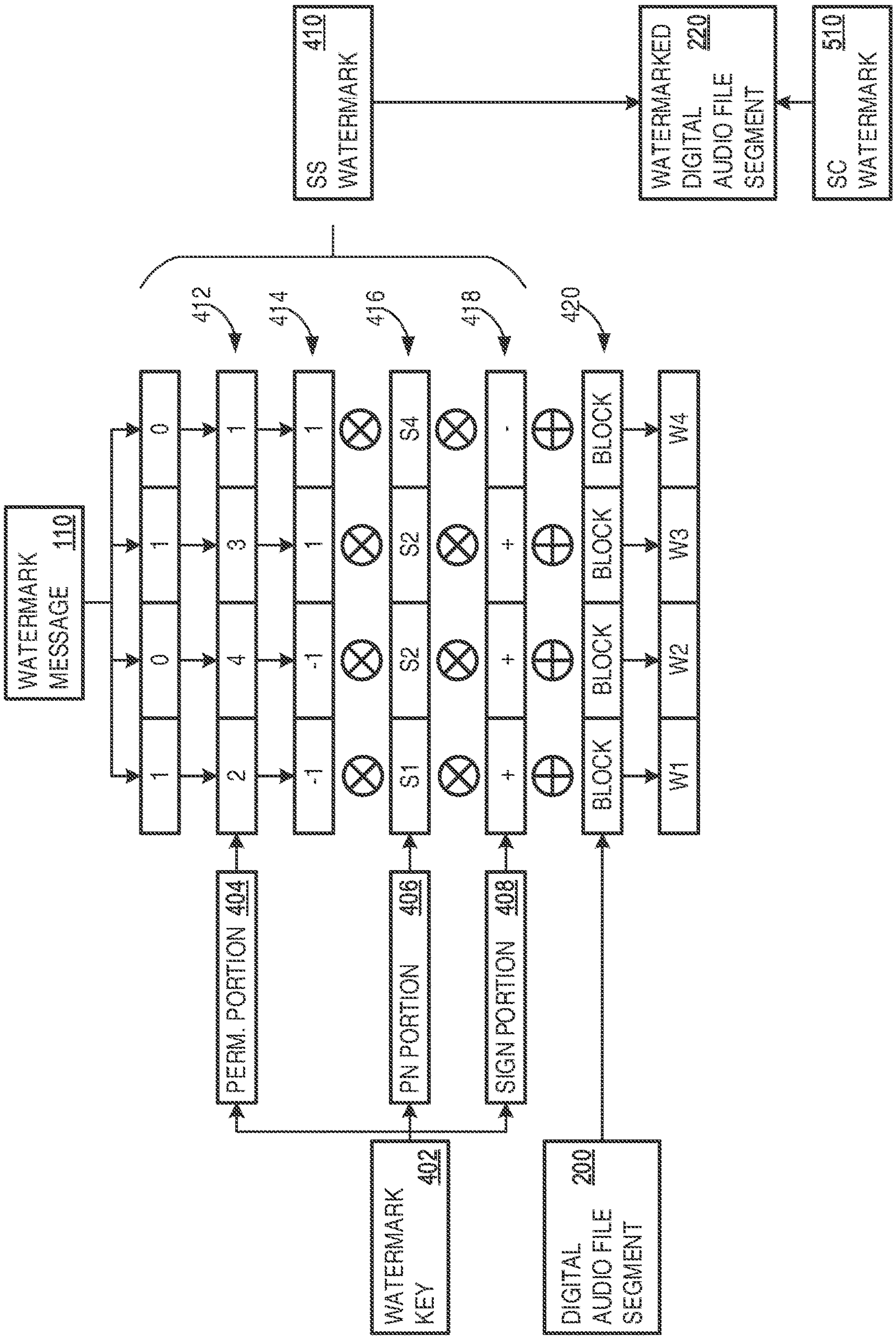
FIG. 4 illustrates stages of generating a spread spectrum watermark, as may occur in the arrangement of FIG. 1.
Figure 5:
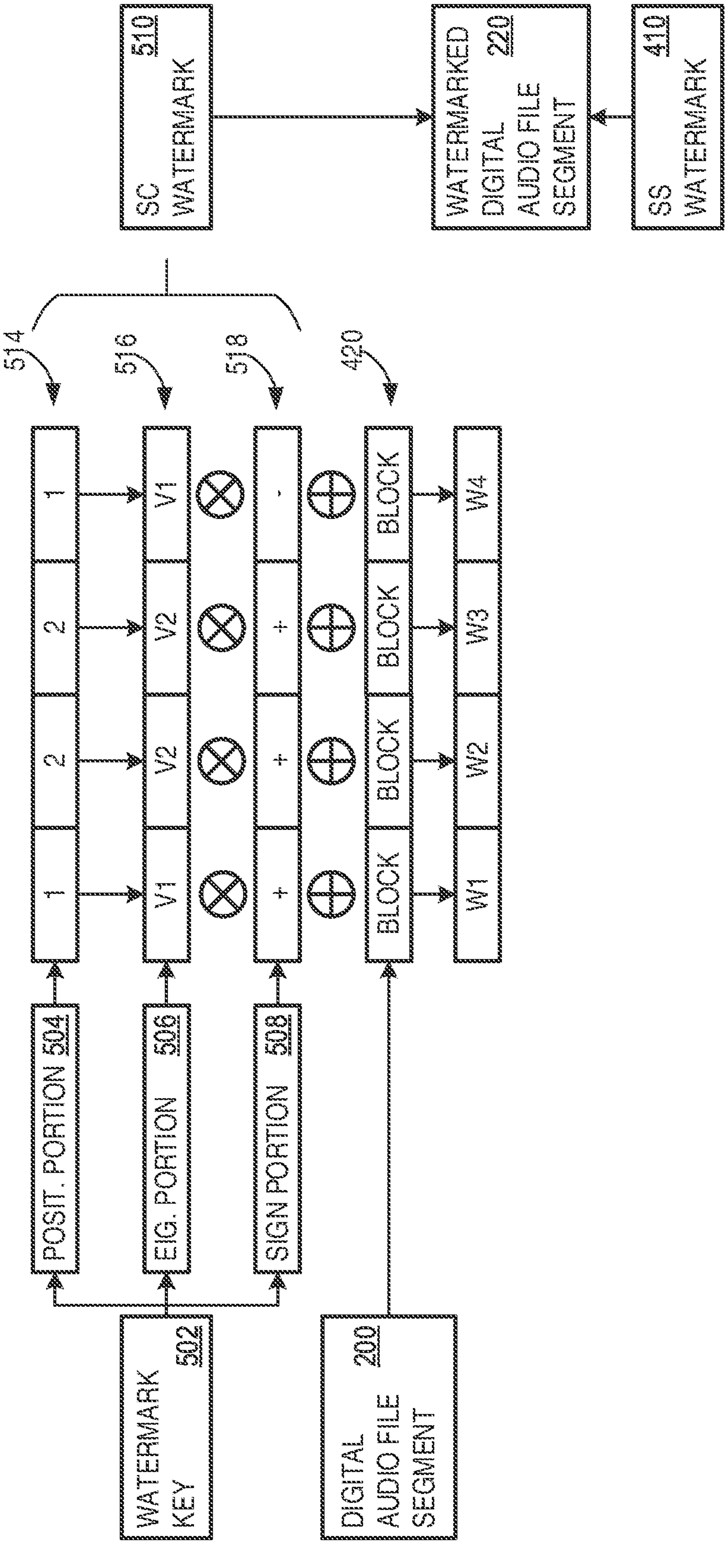
FIG. 5 illustrates stages of generating a self-correlated watermark, as may occur in the arrangement of FIG. 1.

The excitation signal from LPC analysis component 302 is transformed by a DCT component 304. A self-correlated embedding 340 generates self-correlated watermark 510, as shown in FIG. 5. An inverse DCT (IDCT) component 314 transforms the audio data back to the time domain. An analysis filter bank 306 also follows LPC analysis component 302 and performs a sub-band decomposition. A spread spectrum embedding 360 generates spread spectrum watermark 410, as shown in FIG. 4, and a synthesis filter bank 316 converts the signal for combination with the output of IDCT component 314. These orthogonal transformations, DCT and sub-band decomposition, retain the signal quality close to that of the original audio.

The strength of the watermarks is controlled by a psychoacoustic strength control 308, which determines the strength of the audio power in any segment of digital audio file 102 for which a watermark is to be embedded. The strength is controlled based on a psychoacoustic model that models the human auditory system. The strength is a multiplication factor for the watermark to ensure that the watermark energy remains beneath the threshold of human hearing. A masking curve is calculated from the input audio according to the psychoacoustic model, and a strength factor is determined to control the strength of watermark to ensure the energy of watermark is below the masking curve.

An LPC synthesis component 312 completes the process to permit embedding self-correlated watermark 510 and spread spectrum watermark 410 into digital audio file 102 to produce watermarked digital audio file 104.

FIG. 4 illustrates multiple stages of generating spread spectrum watermark 410, which is embedded into watermarked digital audio file segment 220, along with self-correlated watermark 510. As illustrated, watermark key 402 three portions which, in some examples are 32-bits each. The portions are a pseudo-noise (PN) portion 406 that provides a PN generator seed, a permutation portion 404 that provides permutation information, and a sign portion 408 that provides sign information. Watermark message 110 is permuted according to a permutation array 412, generated from permutation portion 404, into a permuted watermark message 414. A PN sequence 416 (1's and −1's) is generated from PN portion 406, and multiplied with permuted watermark message 414. This is multiplied by a sign sequence 418 that is generated with sign portion 408. This result is combined with blocks 420 from digital audio file segment 200 (along with self-correlated watermark 510) to produce watermarked digital audio file segment 220.

This process may be represented as:

$$\tilde{x}_i = x_i + \alpha \cdot s_i \cdot g_i w_i \quad \text{Eq. (1)}$$

where $\overline{x}_i$ is a watermarked block, $x_i$ is the corresponding audio block, a is the strength, $s_i$ is the sign, $g_i$ is energy about $x_i$, and $w_i$ is the watermark.

FIG. 5 illustrates multiple stages of generating self-correlated watermark 510, which is embedded into watermarked digital audio file segment 220, along with spread spectrum watermark 410. As illustrated, watermark key 502 has three portions which, in some examples are 32-bits each. The portions are a position portion 504 providing position information as a position array 514, an eigenvector portion 506 providing eigenvector information, and a sign portion 508 that provides sign information. Position array 514 controls the positions of eigenvector V1 and eigenvector V2, generated from eigenvector portion 506, in an eigenvector array 516. Eigenvector array 516 provides a series of mutually orthogonal vectors that are embedded alternately, denoted as V1 and V2. This is multiplied by a sign sequence 518 that is generated with sign portion 508. This result is combined with blocks 420 from digital audio file segment 200 (along with spread spectrum watermark 410) to produce watermarked digital audio file segment 220.

This process may be represented as:

$$\tilde{x}_i = x_i + \alpha \cdot s_i \cdot g_i v_i \quad \text{Eq. (2)}$$

where $\overline{x}_i$ is the watermarked block, $x_i$ is the audio block, a is the strength, $s_i$ is the sign, $g_i$ is energy about $x_i$ and $v_i$ is the watermark.

Figure 6:
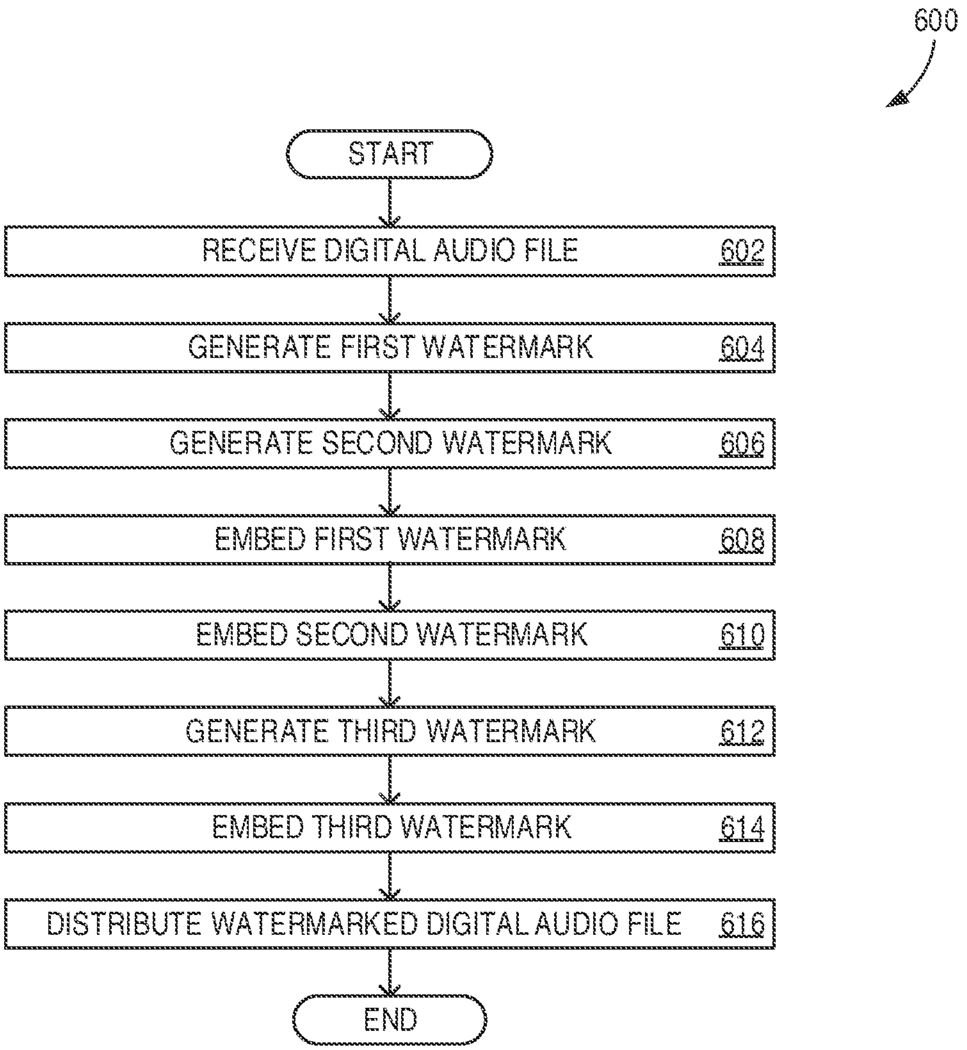
FIG. 6 is a flowchart illustrating exemplary operations that may performed by the arrangement of FIG. 1.

FIG. 6 is a flowchart 600 illustrating exemplary operations involved in detecting a watermark for authenticating digital audio. In some examples, operations described for flowchart 600 are performed by computing device 1400 of FIG. 14. Flowchart 600 commences with operation 602, which includes receiving digital audio file 102, and operation 604 includes generating spread spectrum watermark 410 (a first watermark) using watermark key 402 (a first key), wherein spread spectrum watermark 410 is band-limited to bandwidth 201 (a first bandwidth). In some examples, spread spectrum watermark 410 holds watermark message 110. In some examples, bandwidth 201 extends from 6 KHz to 8 KHz.

Operation 606 includes generating self-correlated watermark 510 (a second watermark) using watermark key 502 (a second key), wherein self-correlated watermark 510 is band-limited to bandwidth 201 (a second bandwidth). In some examples, self-correlated watermark 510 holds watermark message 110 (or another watermark message). In some examples, bandwidth 201 extends from 3 KHz to 4 KHz. Operation 608 includes embedding spread spectrum watermark 410 into digital audio file segment 200. Operation 610 includes embedding self-correlated watermark 510 into digital audio file segment 200. In some examples, the first bandwidth has a lower frequency limit above 5 KHz and the second bandwidth has an upper frequency limit below 5 KHz, so that the second bandwidth does not overlap with the first bandwidth.

In some examples, the first and second watermarks comprise different watermarking schemes, each selected from the list consisting of: a spread spectrum watermark, a self-correlated watermark, and a patchwork watermark. In some examples, the first watermark comprises a spread spectrum watermark and is band-limited to 6 KHz to 8 KHz. In some examples, the second watermark comprises a self-correlated watermark and is band-limited to 3 KHz to 4 KHz. In some examples, watermark key 402 comprises a first set of at least 96 bits. In some examples, watermark key 502 comprises a second set of at least 96 bits. In some examples, watermark key 502 has a different value than watermark key 402. In some examples, a key for a spread spectrum watermark comprises three 32-bit portions, a first portion of the three portions functions as a PN generator seed, a second portion of the three portions provides permutation information, and a third portion of the three portions provides sign information. In some examples, a key for a self-correlated watermark comprises three 32-bit portions, a first portion of the three portions functions as a position array, a second portion of the three portions provides eigenvector information, and a third portion of the three portions provides sign information;

In some examples, a third watermark (or more) may also be added into watermarked digital audio file segment 220. For example a patchwork watermark may be used as the third watermark. Thus, in examples using a third watermark, operation 612 includes generating the third watermark using the third key. In some examples, the third watermark is band-limited to a third bandwidth. In some examples, the third bandwidth does overlap with the first bandwidth or the second bandwidth. Operation 614 includes embedding the third watermark into digital audio file segment 200. Operation 616 includes distributing watermarked digital audio file 104.

Figure 7:
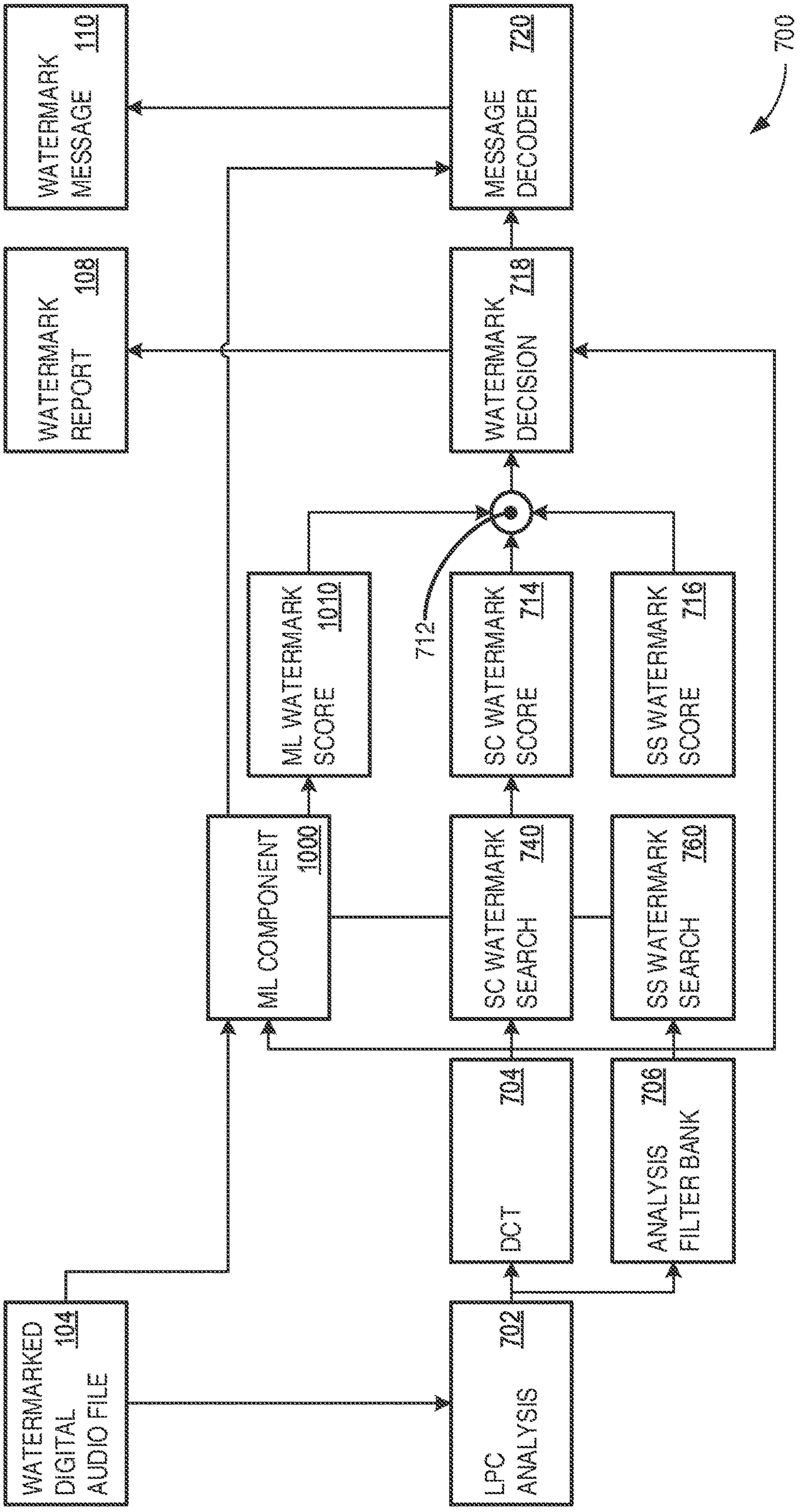
FIG. 7 illustrates further detail for the watermark detection module of the arrangement of FIG. 1.

FIG. 7 illustrates further detail for watermark detection module 700. Watermark detection module 700 includes an LPC analysis component 702 that receives watermarked digital audio file 104. A searching method is utilized to search for the watermark embedding position in the audio. After searching, scores for the watermarks are calculated at the position that maximizes the existence probability of the watermarks. The higher the scores, the higher the probability of the existence of a watermark. Watermark detection module 700 branches to detect both self-correlated watermark 510 and spread spectrum watermark 410 (and/or other watermarks that may have been embedded into watermarked digital audio file 104).

Figure 8:
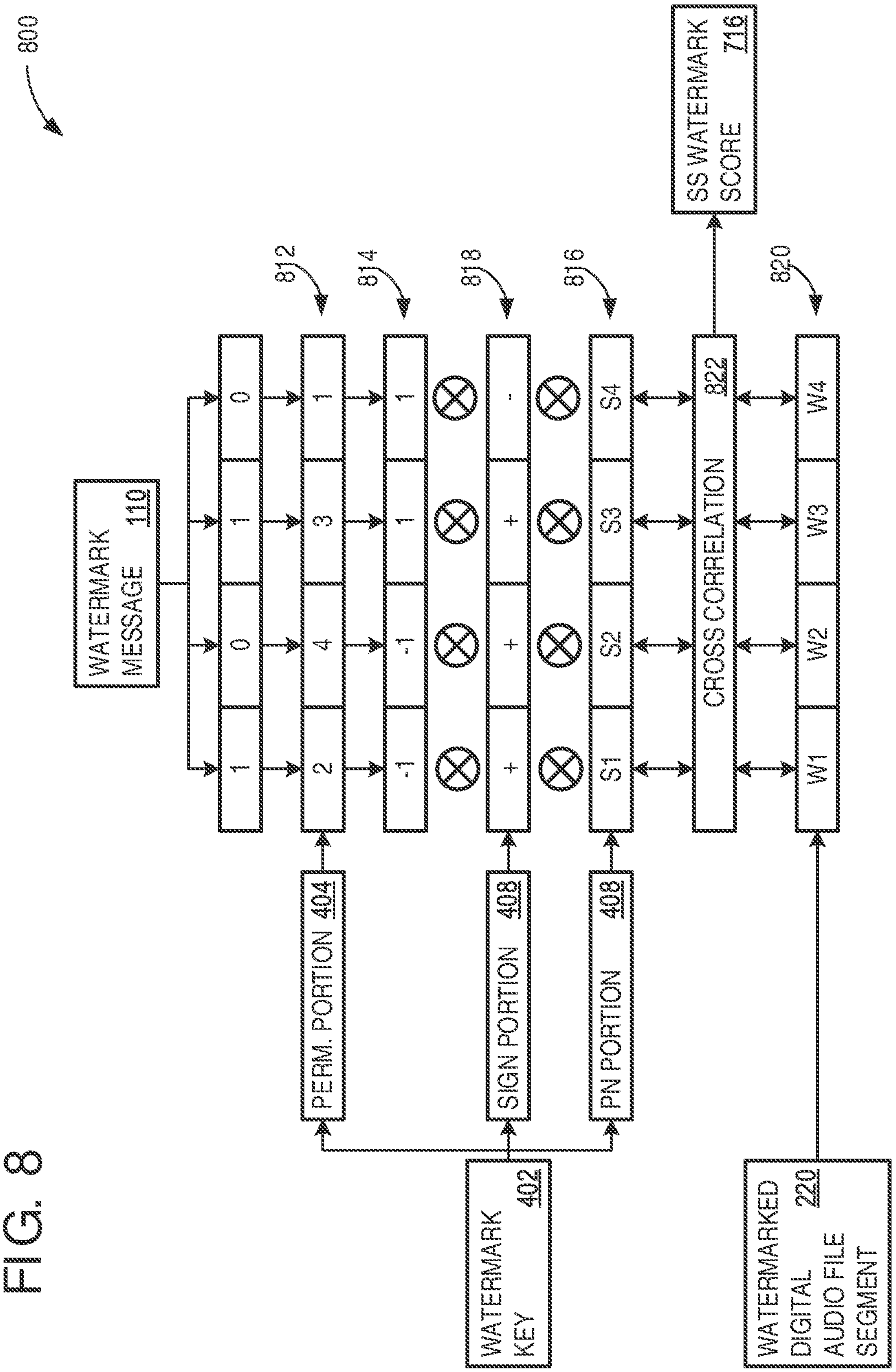
FIG. 8 illustrates stages of detecting a spread spectrum watermark, as may occur in the arrangement of FIG. 1.
Figure 9:
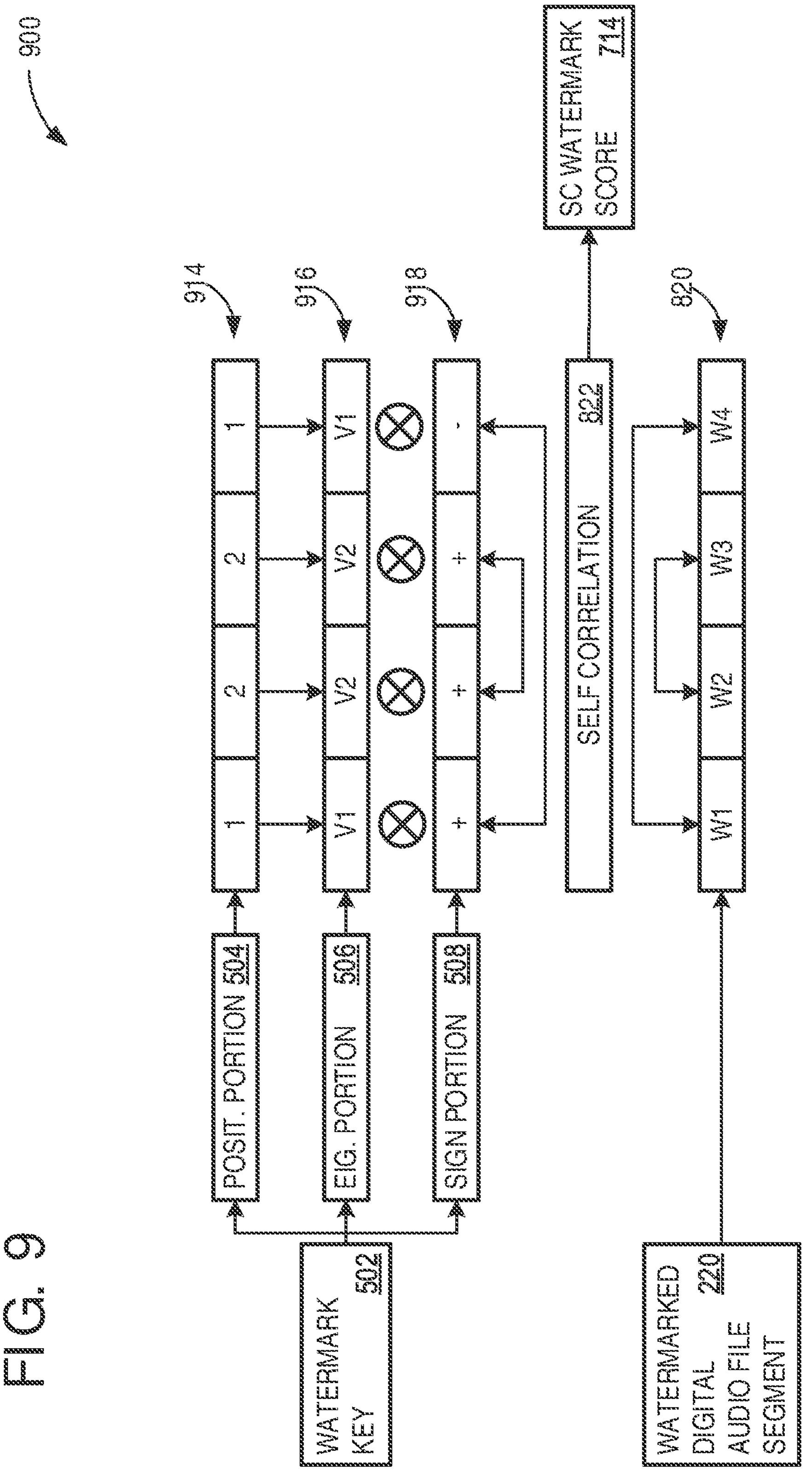
FIG. 9 illustrates stages of detecting a self-correlated watermark, as may occur in the arrangement of FIG. 1.
Figure 10:
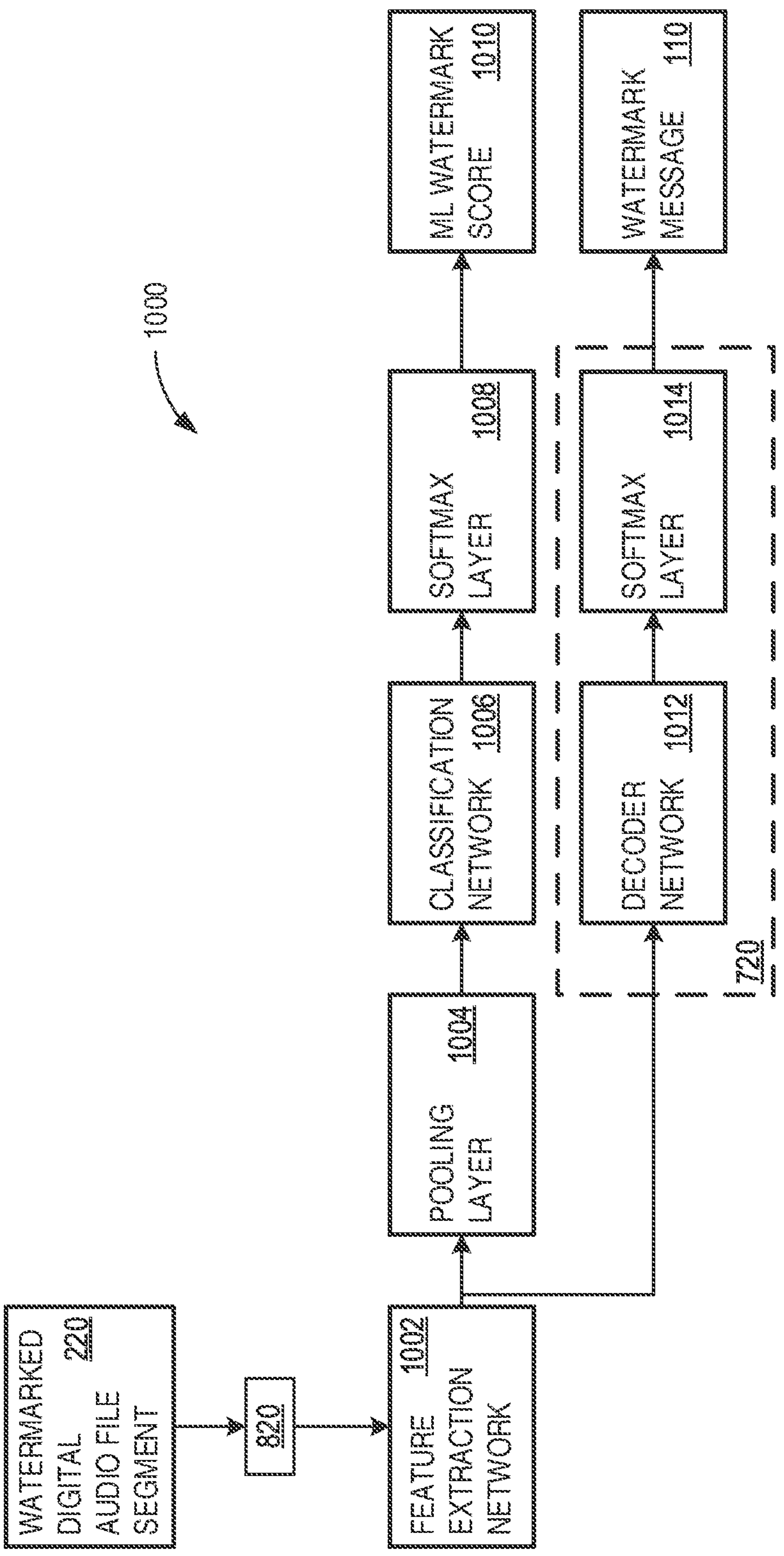
FIG. 10 illustrates a machine learning (ML) component that may be advantageously employed to enhance watermark detection in the arrangement of FIG. 1.

The excitation signal from LPC analysis component 702 is transformed by a DCT component 704. A self-correlated watermark search 740 generates self-correlated watermark score 714, as shown in FIG. 9. An analysis filter bank 706 also follows LPC analysis component 302 and performs a sub-band decomposition. A spread spectrum watermark search 760 generates spread spectrum watermark score 716, as shown in FIG. 8. In some examples, to further enhance the robustness, an ML component 1000 generates an ML watermark score 1010, as shown in FIG. 10. The various scores are combined into a composite watermark score 712, which is provided to a watermark decision component 718 (e.g., a watermark detector). Watermark decision component 718 generates and outputs watermark report 108, indicating whether a watermark was detected in watermarked digital audio file 104 and/or any of the individual scores (e.g., composite watermark score 712, self-correlated watermark score 714, spread spectrum watermark score 716, and/or ML watermark score 1010).

In some examples, if watermark decision component 718 detects a watermark in watermarked digital audio file 104, ML component 1000 and a message decoder 720 outputs a recovered watermark message 110.

FIG. 8 illustrates stages of detecting spread spectrum watermark 410. The same watermark key 402 is used for detection as was used for generation. Watermark message 110 is permuted according to a permutation array 812, generated from permutation portion 404, into a permuted watermark message 814. This is multiplied by a sign sequence 818 that is generated with sign portion 408. A PN sequence 816 (1's and −1's) is generated from PN portion 406, and multiplied with the product of permuted watermark message 814 and sign sequence 818. This result is cross correlated using a cross correlation operation 822 with combined with blocks 820 from watermarked digital audio file segment 220 to generate spread spectrum watermark score 716.

This scoring process may be represented as:

$$\rho_n = \langle \tilde{x}_i, w_n \rangle;\ \text{bit} = \begin{cases} 1 & \text{if } \rho_n > 0 \\ 0 & \text{if } \rho_n < 0 \end{cases} \quad \text{Eq. (3)}$$

using $$BER = 1 - \frac{\text{correct bit number}}{\text{total bit number}} \quad \text{Eq. (4)}$$

where $p_n$ is the correlation and BER denotes the bit error rate. BER varies from 0 (zero), if a watermark is detected without errors to 50% if there is no trace of a watermark (assuming an equal likelihood of a random bit giving a correct or incorrect result). It is possible to calculate the BER because the encoded watermark sequence is known. The closer the BER is to 0, the higher the probability of the watermark's presence. If closer the BER is to 50%, the lower the probability of the watermark's presence.

FIG. 9 illustrates stages of detecting self-correlated watermark 510. The same watermark key 502 is used for detection as was used for generation. Position portion 504 provides position information for position array 914 that controls the positions of eigenvector V1 and eigenvector V2, generated from eigenvector portion 506, in an eigenvector array 916. Eigenvector array 916 is multiplied by a sign sequence 918 that is generated with sign portion 508. This result is self-correlated using a self-correlation operation 922 with combined with blocks 820 from watermarked digital audio file segment 220 to generate self-correlated watermark score 714.

This scoring process may be represented as:

$$\rho_n = \sum_{i=n-m}^{n+m} \sum_{j=1}^{L} \langle \tilde{x}_i, \tilde{x}_{i+j} \rangle \quad \text{Eq. (5)}$$

and $$\rho_n = \begin{cases} \rho_0 + C \cdot \sum_{i=n-m}^{n+m} \sum_{j=1}^{L} \langle \tilde{w}_i, \tilde{w}_{i+j} \rangle & \text{if watermark} \\ \rho_0 & \text{if no watermark} \end{cases} \quad \text{Eq. (6)}$$

where C is a scalar constant.

According to the equations (5) and (6), if no watermark is present, the self-correlation will remain at a low level. However, if a watermark is present, the self-correlation will be a constant value added to the self-correlation about the watermark. This enables determination of whether a watermark is present.

FIG. 10 illustrates further detail for ML component 1000. Blocks 820 from watermarked digital audio file segment 220 are provided to a feature extraction network 1002. Features from feature extraction network 1002 are provided to a pooling layer 1004 and then a classification network 1006. A softmax layer 1008 generates ML watermark score 1010. Features from feature extraction network 1002 are provided to a decoder network 1012, and a softmax layer 1008 (together, message decoder 720) outputs (recovers) watermark message 110. In some examples, feature extraction network 1002, classification network 1006, and decoder network 1012 comprise neural networks, and are trained with a multitask training method and/or an adversarial training method, using thousands of hours of watermarked audio data.

Figure 11:
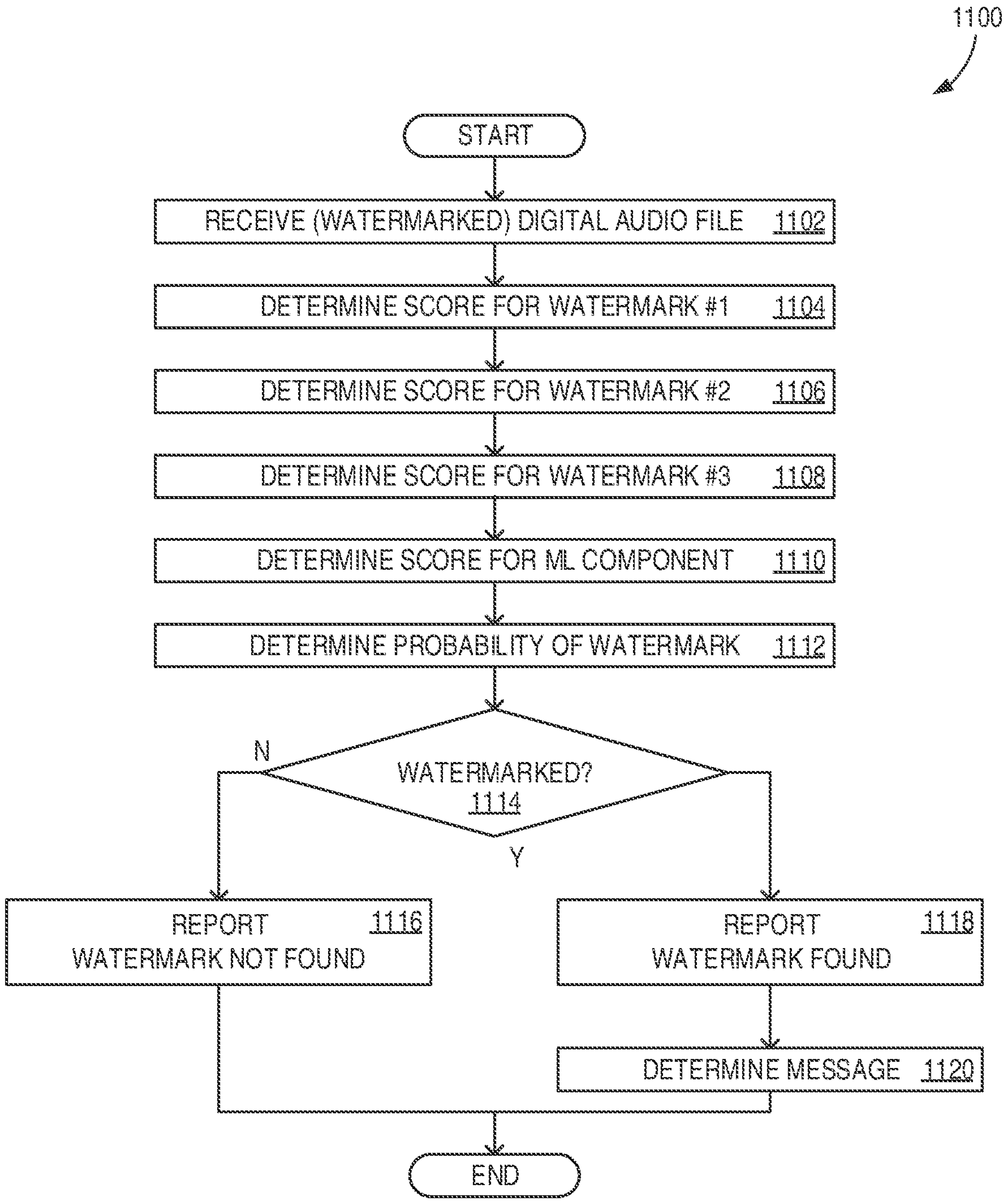
FIG. 11 is another flowchart illustrating exemplary operations that may performed by the arrangement of FIG. 1.

FIG. 11 is a flowchart 1100 illustrating exemplary operations involved in authenticating digital audio. In some examples, operations described for flowchart 1100 are performed by computing device 1400 of FIG. 14. Flowchart 1100 commences with operation 1102, which includes receiving a digital audio file (watermarked digital audio file 104), and operation 1104 includes determining spread spectrum watermark score 716 (a first watermark score) of digital audio file segment 220 for spread spectrum watermark 410 using watermark key 402, wherein spread spectrum watermark 410 is band-limited to bandwidth 201. Operation 1106 includes determining self-correlated watermark score 714 (a second watermark score) of digital audio file segment 220 for self-correlated watermark 510 using watermark key 502, wherein self-correlated watermark 510 is band-limited to bandwidth 202, and wherein bandwidth 202 does not overlap with bandwidth 01.

In examples using a third watermark, operation 1108 includes determining the watermark score for digital audio file segment 220 for a third watermark using a third watermark key. Operation 1110 includes determining, using ML component 1000, ML watermark score 1010 (a third watermark score) of digital audio file segment 220. In some examples, ML component 1000 comprises feature extraction network 1002 and classification network 1006. In some examples, ML component 1000 further comprises decoder network 1020.

Operation 1112 includes, based on at least spread spectrum watermark score 716 and self-correlated watermark score 714, determining a probability that watermarked digital audio file 104 is watermarked. In some examples, determining the probability that watermarked digital audio file 104 is watermarked comprises, based on at least spread spectrum watermark score 716, self-correlated watermark score 714, and the watermark score for the third watermark, determining the probability that watermarked digital audio file 104 is watermarked. In some examples, determining the probability that watermarked digital audio file 104 is watermarked comprises, based on at least spread spectrum watermark score 716, self-correlated watermark score 714, and ML watermark score 1010, determining the probability that watermarked digital audio file 104 is watermarked.

Decision operation 1114 determines whether to report the received digital audio file as watermark found or watermark not found. If not found, watermark report 108 indicates that no watermark was found, in operation 1116. Otherwise, operation 1118 includes, based on at least determining the probability that watermarked digital audio file 104 is watermarked, generating watermark report 108 indicating that digital audio file 102 is watermarked. In some examples, a hard decision (decision operation 1114) may not be used, and operation 1118 merely reports the probability. Together, operations 1116 and 1118 include generating watermark report 108 indicating whether digital audio file 102 is watermarked. If a watermark is detected, operation 1120 includes determining, using ML component 1000, the decoded watermark message 110.

Figure 12:
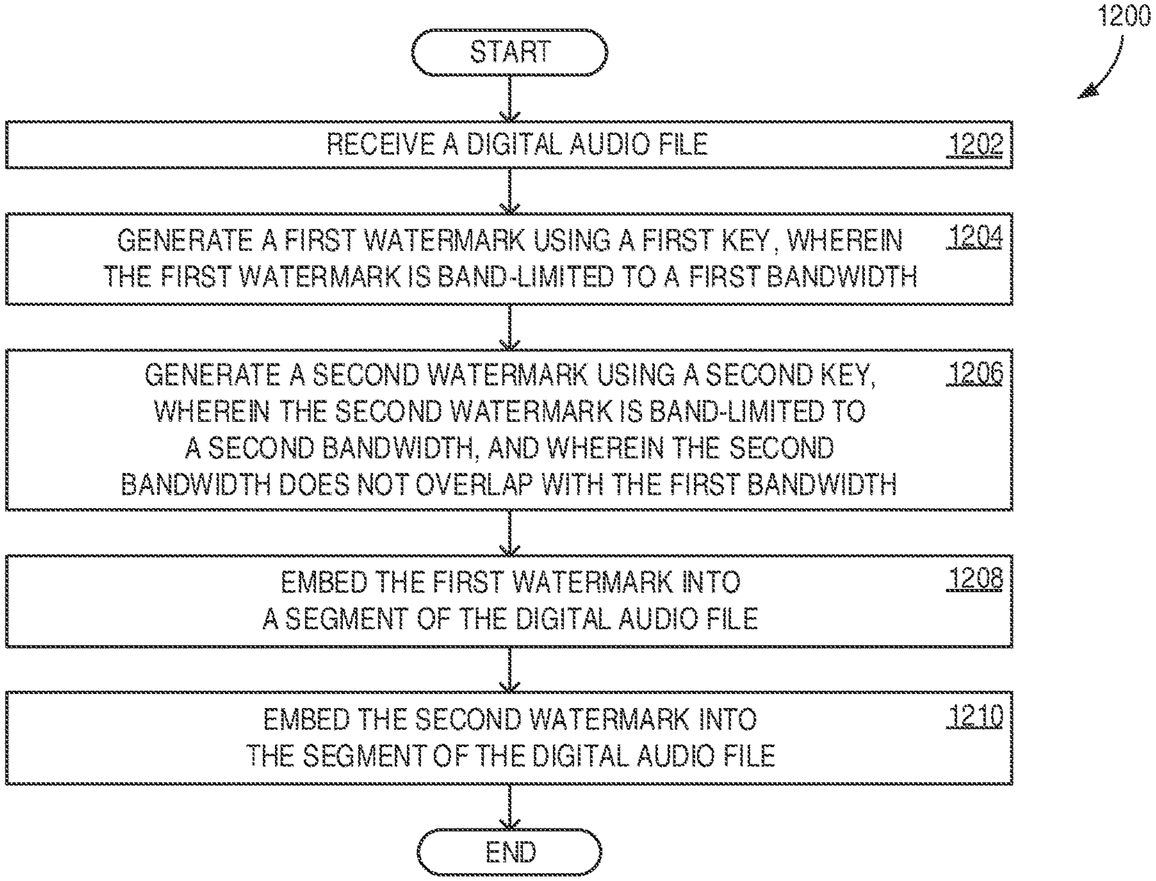
FIG. 12 is another flowchart illustrating exemplary operations that may performed by the arrangement of FIG. 1.

FIG. 12 is a flowchart 1200 illustrating exemplary operations involved in detecting a watermark for authenticating digital audio. In some examples, operations described for flowchart 1200 are performed by computing device 1400 of FIG. 14. Flowchart 1200 commences with operation 1202, which includes receiving a digital audio file. Operation 1204 includes generating a first watermark using a first key, wherein the first watermark is band-limited to a first bandwidth. Operation 1206 includes generating a second watermark using a second key, wherein the second watermark is band-limited to a second bandwidth, and wherein the second bandwidth does not overlap with the first bandwidth. Operation 1208 includes embedding the first watermark into a segment of the digital audio file. Operation 1210 includes embedding the second watermark into the segment of the digital audio file.

Figure 13:
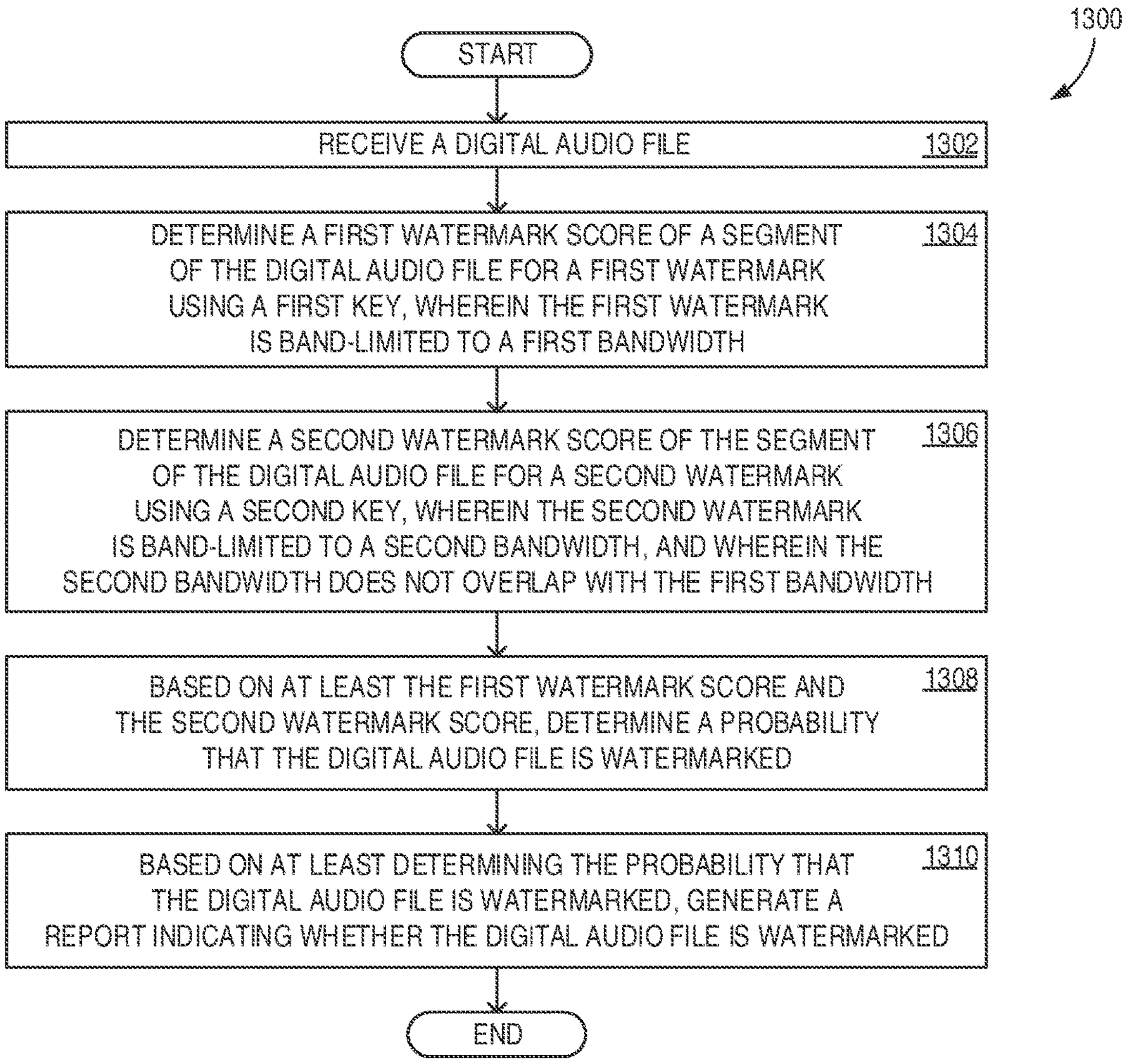
FIG. 13 is another flowchart illustrating exemplary operations that may performed by the arrangement of FIG. 1.

FIG. 13 is a flowchart 1300 illustrating exemplary operations involved in authenticating digital audio. In some examples, operations described for flowchart 1300 are performed by computing device 1400 of FIG. 14. Flowchart 1300 commences with operation 1302, which includes receiving a digital audio file. Operation 1304 includes determining a first watermark score of a segment of the digital audio file for a first watermark using a first key, wherein the first watermark is band-limited to a first bandwidth. Operation 1306 includes determining a second watermark score of the segment of the digital audio file for a second watermark using a second key, wherein the second watermark is band-limited to a second bandwidth, and wherein the second bandwidth does not overlap with the first bandwidth. Operation 1308 includes, based on at least the first watermark score and the second watermark score, determining a probability that the digital audio file is watermarked. Operation 1310 includes, based on at least determining the probability that the digital audio file is watermarked, generating a report indicating whether the digital audio file is watermarked.

Additional Examples

An example method of authenticating digital audio comprises: receiving a digital audio file; generating a first watermark using a first key, wherein the first watermark is band-limited to a first bandwidth; generating a second watermark using a second key, wherein the second watermark is band-limited to a second bandwidth, and wherein the second bandwidth does not overlap with the first bandwidth; embedding the first watermark into a segment of the digital audio file; and embedding the second watermark into the segment of the digital audio file.

An example system for authenticating digital audio comprises: a processor; and a computer-readable medium storing instructions that are operative upon execution by the processor to: receive a digital audio file; generate a first watermark using a first key, wherein the first watermark is band-limited to a first bandwidth; generate a second watermark using a second key, wherein the second watermark is band-limited to a second bandwidth, and wherein the second bandwidth does not overlap with the first bandwidth; embed the first watermark into a segment of the digital audio file; and embed the second watermark into the segment of the digital audio file.

One or more example computer storage devices has computer-executable instructions stored thereon, which, on execution by a computer, cause the computer to perform operations comprising: receiving a digital audio file: generating a first watermark using a first key, wherein the first watermark is band-limited to a first bandwidth; generating a second watermark using a second key, wherein the second watermark is band-limited to a second bandwidth, and wherein the second bandwidth does not overlap with the first bandwidth; embedding the first watermark into a segment of the digital audio file; and embedding the second watermark into the segment of the digital audio file.

An example method of authenticating digital audio comprises: receiving a digital audio file; determining a first watermark score of a segment of the digital audio file for a first watermark using a first key, wherein the first watermark is band-limited to a first bandwidth; determining a second watermark score of the segment of the digital audio file for a second watermark using a second key, wherein the second watermark is band-limited to a second bandwidth, and wherein the second bandwidth does not overlap with the first bandwidth; based on at least the first watermark score and the second watermark score, determining a probability that the digital audio file is watermarked; and based on at least determining the probability that the digital audio file is watermarked, generating a report indicating whether the digital audio file is watermarked.

An example system for authenticating digital audio comprises: a processor; and a computer-readable medium storing instructions that are operative upon execution by the processor to: receive a digital audio file; determine a first watermark score of a segment of the digital audio file for a first watermark using a first key, wherein the first watermark is band-limited to a first bandwidth; determine a second watermark score of the segment of the digital audio file for a second watermark using a second key, wherein the second watermark is band-limited to a second bandwidth, and wherein the second bandwidth does not overlap with the first bandwidth; based on at least the first watermark score and the second watermark score, determine a probability that the digital audio file is watermarked; and based on at least determining the probability that the digital audio file is watermarked, generate a report indicating whether the digital audio file is watermarked.

One or more example computer storage devices has computer-executable instructions stored thereon, which, on execution by a computer, cause the computer to perform operations comprising: receiving a digital audio file; determining a first watermark score of a segment of the digital audio file for a first watermark using a first key, wherein the first watermark is band-limited to a first bandwidth; determining a second watermark score of the segment of the digital audio file for a second watermark using a second key, wherein the second watermark is band-limited to a second bandwidth, and wherein the second bandwidth does not overlap with the first bandwidth; based on at least the first watermark score and the second watermark score, determining a probability that the digital audio file is watermarked; and based on at least determining the probability that the digital audio file is watermarked, generating a report indicating whether the digital audio file is watermarked.

Alternatively. or in addition to the other examples described herein, examples include any combination of the following:

the first watermark holds a message;

the second watermark holds a message;

the first bandwidth has a lower frequency limit above 5 KHz;

the first bandwidth extends from 6 KHz to 8 KHz;

the second bandwidth has an upper frequency limit below 5 KHz;

the second bandwidth extends from 3 KHz to 4 KHz;

the first and second watermarks comprise different watermarking schemes, each selected from the list consisting of: a spread spectrum watermark, a self-correlated watermark, and a patchwork watermark;

the first watermark comprises a spread spectrum watermark and is band-limited to 6 KHz to 8 KHz;

the second watermark comprises a self-correlated watermark and is band-limited to 3 KHz to 4 KHz;

the first key comprises a first set of at least 96 bits;

the second key comprises a second set of at least 96 bits;

the second key has a different value than the first key;

a key for a spread spectrum watermark comprises three 32-bit portions, a first portion of the three portions functions as a PN generator seed, a second portion of the three portions provides permutation information, and a third portion of the three portions provides sign information;

a key for a self-correlated watermark comprises three 32-bit portions, a first portion of the three portions functions as a position array, a second portion of the three portions provides eigenvector information, and a third portion of the three portions provides sign information;

generating a third watermark using a third key;

the third watermark is band-limited to a third bandwidth;

the third bandwidth does overlap with the first bandwidth or the second bandwidth;

embedding the third watermark into the segment of the digital audio file;

determining a first watermark score of the segment of the digital audio file for the first watermark using the first key;

determining a second watermark score of the segment of the digital audio file for the second watermark using the second key;

based on at least the first watermark score and the second watermark score, determining a probability that the digital audio file is watermarked;

determining a fourth watermark score of the segment of the digital audio file for a third watermark using a third key;

determining the probability that the digital audio file is watermarked comprises, based on at least the first watermark score, the second watermark score, and the fourth watermark score, determining the probability that the digital audio file is watermarked;

determining, using an ML component, a third watermark score of the segment of the digital audio file;

determining the probability that the digital audio file is watermarked comprises, based on at least the first watermark score, the second watermark score, and the third watermark score, determining the probability that the digital audio file is watermarked;

the ML component comprises a feature extraction network and a classification network;

determining, using the ML component, a decoded watermark message;

the ML component further comprises a decoder network;

based on at least determining the probability that the digital audio file is watermarked, generating a report indicating whether the digital audio file is watermarked;

generating the first watermark using the first key;

generating the second watermark using the second key;

embedding the first watermark into the segment of the digital audio file; and embedding the second watermark into the segment of the digital audio file.

While the aspects of the disclosure have been described in terms of various examples with their associated operations, a person skilled in the art would appreciate that a combination of operations from any number of different examples is also within scope of the aspects of the disclosure.

Example Operating Environment

Figure 14:
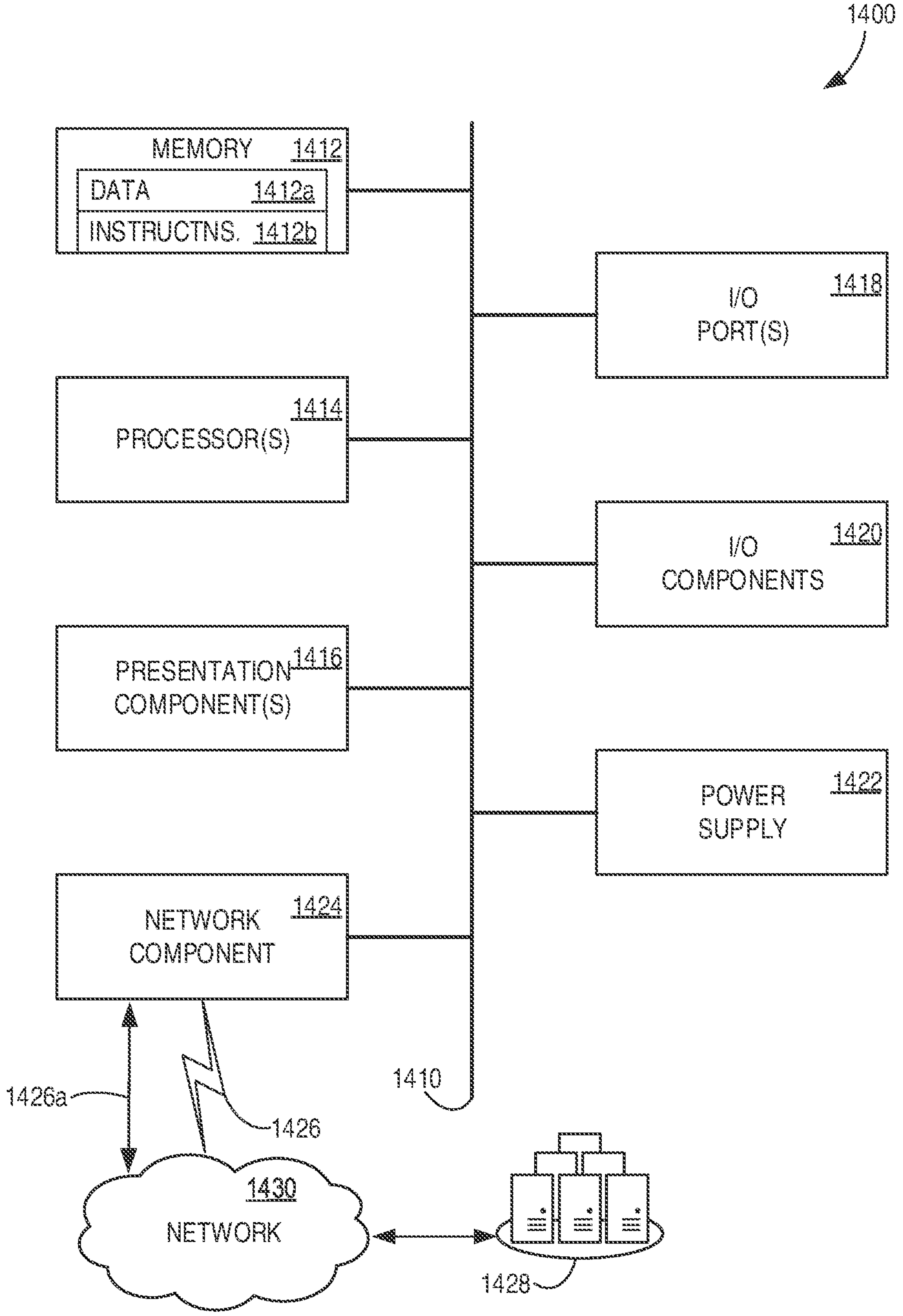
FIG. 14 is a block diagram of an example computing environment suitable for implementing some of the various examples disclosed herein.

FIG. 14 is a block diagram of an example computing device 1400 for implementing aspects disclosed herein, and is designated generally as computing device 1400. Computing device 1400 is but one example of a suitable computing environment and is not intended to suggest any limitation as to the scope of use or functionality of the examples disclosed herein. Neither should computing device 1400 be interpreted as having any dependency or requirement relating to any one or combination of components/modules illustrated. The examples disclosed herein may be described in the general context of computer code or machine-useable instructions, including computer-executable instructions such as program components, being executed by a computer or other machine, such as a personal data assistant or other handheld device. Generally, program components including routines, programs, objects, components, data structures, and the like, refer to code that performs particular tasks, or implement particular abstract data types. The disclosed examples may be practiced in a variety of system configurations, including personal computers, laptops, smart phones, mobile tablets, hand-held devices, consumer electronics, specialty computing devices, etc. The disclosed examples may also be practiced in distributed computing environments when tasks are performed by remote-processing devices that are linked through a communications network.

Computing device 1400 includes a bus 1410 that directly or indirectly couples the following devices: computer-storage memory 1412, one or more processors 1414, one or more presentation components 1416, I/O ports 1418, I/O components 1420, a power supply 1422, and a network component 1424. While computing device 1400 is depicted as a seemingly single device, multiple computing devices 1400 may work together and share the depicted device resources. For example, memory 1412 may be distributed across multiple devices, and processor(s) 1414 may be housed with different devices.

Bus 1410 represents what may be one or more busses (such as an address bus, data bus, or a combination thereof). Although the various blocks of FIG. 14 are shown with lines for the sake of clarity, delineating various components may be accomplished with alternative representations. For example, a presentation component such as a display device is an I/O component in some examples, and some examples of processors have their own memory. Distinction is not made between such categories as "workstation," "server," "laptop," "hand-held device," etc., as all are contemplated within the scope of FIG. 14 and the references herein to a "computing device." Memory 1412 may take the form of the computer-storage media references below and operatively provide storage of computer-readable instructions, data structures, program modules and other data for the computing device 1400. In some examples, memory 1412 stores one or more of an operating system, a universal application platform, or other program modules and program data. Memory 1412 is thus able to store and access data 1412*a* and instructions 1412*b* that are executable by processor 1414 and configured to carry out the various operations disclosed herein.

In some examples, memory 1412 includes computer-storage media in the form of volatile and/or nonvolatile memory, removable or non-removable memory, data disks in virtual environments, or a combination thereof. Memory 1412 may include any quantity of memory associated with or accessible by the computing device 1400. Memory 1412 may be internal to the computing device 1400 (as shown in FIG. 14), external to the computing device 1400 (not shown), or both (not shown). Examples of memory 1412 in include, without limitation, random access memory (RAM); read only memory (ROM); electronically erasable programmable read only memory (EEPROM); flash memory or other memory technologies; CD-ROM, digital versatile disks (DVDs) or other optical or holographic media; magnetic cassettes, magnetic tape, magnetic disk storage or other magnetic storage devices; memory wired into an analog computing device; or any other medium for encoding desired information and for access by the computing device 1400. Additionally, or alternatively, the memory 1412 may be distributed across multiple computing devices 1400, for example, in a virtualized environment in which instruction processing is carried out on multiple devices 1400. For the purposes of this disclosure, "computer storage media," "computer-storage memory," "memory," and "memory devices" are synonymous terms for the computer-storage memory 1412, and none of these terms include carrier waves or propagating signaling.

Processor(s) 1414 may include any quantity of processing units that read data from various entities, such as memory 1412 or I/O components 1420. Specifically, processor(s) 1414 are programmed to execute computer-executable instructions for implementing aspects of the disclosure. The instructions may be performed by the processor, by multiple processors within the computing device 1400, or by a processor external to the client computing device 1400. In some examples, the processor(s) 1414 are programmed to execute instructions such as those illustrated in the flow charts discussed below and depicted in the accompanying drawings. Moreover, in some examples, the processor(s) 1414 represent an implementation of analog techniques to perform the operations described herein. For example, the operations may be performed by an analog client computing device 1400 and/or a digital client computing device 1400. Presentation component(s) 1416 present data indications to a user or other device. Exemplary presentation components include a display device, speaker, printing component, vibrating component, etc. One skilled in the art will understand and appreciate that computer data may be presented in a number of ways, such as visually in a graphical user interface (GUI), audibly through speakers, wirelessly between computing devices 1400, across a wired connection, or in other ways. I/O ports 1418 allow computing device 1400 to be logically coupled to other devices including I/O components 1420, some of which may be built in. Example I/O components 1420 include, for example but without limitation, a microphone, joystick, game pad, satellite dish, scanner, printer, wireless device, etc.

The computing device 1400 may operate in a networked environment via the network component 1424 using logical connections to one or more remote computers. In some examples, the network component 1424 includes a network interface card and/or computer-executable instructions (e.g., a driver) for operating the network interface card. Communication between the computing device 1400 and other devices may occur using any protocol or mechanism over any wired or wireless connection. In some examples, network component 1424 is operable to communicate data over public, private, or hybrid (public and private) using a transfer protocol, between devices wirelessly using short range communication technologies (e.g., near-field communication (NFC), Bluetooth™ branded communications, or the like), or a combination thereof. Network component 1424 communicates over wireless communication link 1426 and/or a wired communication link **1426*a* to a cloud resource 1428 across network 1430. Various different examples of communication links 1426 and 1426*a*** include a wireless connection, a wired connection, and/or a dedicated link, and in some examples, at least a portion is routed through the internet.

Although described in connection with an example computing device 1400, examples of the disclosure are capable of implementation with numerous other general-purpose or special-purpose computing system environments, configurations, or devices. Examples of well-known computing systems, environments, and/or configurations that may be suitable for use with aspects of the disclosure include, but are not limited to, smart phones, mobile tablets, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, virtual reality (VR) devices, augmented reality (AR) devices, mixed reality (MR) devices, holographic device, and the like. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein. In examples involving a general-purpose computer, aspects of the disclosure transform the general-purpose computer into a special-purpose computing device when configured to execute the instructions described herein.

By way of example and not limitation, computer readable media comprise computer storage media and communication media. Computer storage media include volatile and nonvolatile, removable and non-removable memory implemented in any method or technology for storage of information such as computer readable instructions, data structures, program modules, or the like. Computer storage media are tangible and mutually exclusive to communication media. Computer storage media are implemented in hardware and exclude carrier waves and propagated signals. Computer storage media for purposes of this disclosure are not signals per se. Exemplary computer storage media include hard disks, flash drives, solid-state memory, phase change random-access memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that may be used to store information for access by a computing device. In contrast, communication media typically embody computer readable instructions, data structures, program modules, or the like in a modulated data signal such as a carrier wave or other transport mechanism and include any information delivery media.

The order of execution or performance of the operations in examples of the disclosure illustrated and described herein is not essential, and may be performed in different sequential manners in various examples. For example, it is contemplated that executing or performing a particular operation before, contemporaneously with, or after another operation is within the scope of aspects of the disclosure. When introducing elements of aspects of the disclosure or the examples thereof, the articles "a," "an," "the," and "said" are intended to mean that there are one or more of the elements. The terms "comprising." "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A method of authenticating digital audio, the method comprising:

receiving a digital audio file, the digital audio file decomposed by linear predictive coding (LPC) analysis into a spectral envelope signal and an excitation signal;

determining a psychoacoustic strength factor, based on a multiplication factor for a watermark, ensuring that watermark energy remains below a masking curve, the masking curve associated with a threshold of human hearing;

generating a first watermark using a first key, the first key derived from the spectral envelope signal, wherein the first watermark is band-limited to a first bandwidth, and a watermark energy of the first watermark is below the psychoacoustic strength factor, the first watermark comprising a spread-spectrum watermark configured for embedding in a higher-frequency non-overlapping bandwidth using a subband decomposition path;

generating a second watermark using a second key, the second key derived from the excitation signal, wherein the second watermark is band-limited to a second bandwidth, a watermark energy of the second watermark is below the psychoacoustic strength factor, and wherein the second bandwidth does not overlap with the first bandwidth, the second watermark comprising a self-correlated watermark configured for embedding in a lower-frequency non-overlapping bandwidth using a discrete cosine transform (DCT) path;

embedding the first watermark into a segment of the digital audio file using a spread-spectrum embedding process configured to operate on subband-decomposed audio; and embedding the second watermark into the segment of the digital audio file using a self-correlated embedding process configured to operate on DCT-domain excitation components.

2. The method of claim 1, wherein the first bandwidth has a lower frequency limit above 5 kilohertz (KHz) and the second bandwidth has an upper frequency limit below 5 KHz.

3. The method of claim 1, further comprising:

determining a first watermark score of the first watermark using the first key;

determining a second watermark score of the second watermark using the second key; and based on at least the first watermark score and the second watermark score, determining a probability that the digital audio file is watermarked.

4. The method of claim 3, further comprising:

determining, using a machine learning (ML) component, a third watermark score of the segment of the digital audio file, wherein determining the probability that the digital audio file is watermarked is based on the first watermark score, the second watermark score, and the third watermark score.

5. A system for authenticating digital audio, the system comprising:

a processor; and a computer-readable medium storing instructions that are operative upon execution by the processor to:

receive a digital audio file, the digital audio file decomposed by linear predictive coding (LPC) analysis into a spectral envelope signal and an excitation signal;

determine a psychoacoustic strength factor, based on a multiplication factor for a watermark, ensuring that watermark energy remains below a masking curve, the masking curve associated with a threshold of human hearing;

generate a first watermark using a first key, the first key derived from the spectral envelope signal, wherein the first watermark is band-limited to a first bandwidth, and a watermark energy of the first watermark is below the psychoacoustic strength factor, the first watermark comprising a spread-spectrum watermark configured for embedding in a higher-frequency non-overlapping bandwidth using a subband decomposition path;

generate a second watermark using a second key, the second key derived from the excitation signal, wherein the second watermark is band-limited to a second bandwidth, a watermark energy of the second watermark is below the psychoacoustic strength factor, and wherein the second bandwidth does not overlap with the first bandwidth, the second watermark comprising a self-correlated watermark configured for embedding in a lower-frequency non-overlapping bandwidth using a discrete cosine transform (DCT) path;

embed the first watermark into a segment of the digital audio file using a spread-spectrum embedding process configured to operate on subband-decomposed audio; and embed the second watermark in the segment of the digital audio file using a self-correlated embedding process configured to operate on DCT-domain excitation components.

6. The system of claim 5, wherein the first bandwidth has a lower frequency limit above 5 kilohertz (KHz) and the second bandwidth has an upper frequency limit below 5 KHz.

7. The system of claim 5, wherein the instructions are further operative to:

determine a first watermark score of the first watermark using the first key;

determine a second watermark score of the second watermark using the second key; and based on at least the first watermark score and the second watermark score, determine a probability that the digital audio file is watermarked.

8. The system of claim 7, wherein the instructions are further operative to:

determine, using a machine learning (ML) component, a third watermark score of the segment of the digital audio file, wherein determining the probability that the digital audio file is watermarked comprises, based on at least the first watermark score, the second watermark score, and the third watermark score, determining the probability that the digital audio file is watermarked.

9. One or more computer storage devices having computer-executable instructions stored thereon, which, on execution by a computer, cause the computer to perform operations comprising:

receiving a digital audio file, the digital audio file decomposed by linear predictive coding (LPC) analysis into a spectral envelope signal and an excitation signal;

determining a first watermark score of a segment of the digital audio file for a first watermark using a first key, the first key derived from the spectral envelope signal, wherein the first watermark is band-limited to a first bandwidth, and a watermark energy of the first watermark is below a psychoacoustic strength factor, the psychoacoustic strength factor based on a multiplication factor for a watermark, ensuring that watermark energy remains below a masking curve, the masking curve associated with a threshold of human hearing, the first watermark comprising a spread-spectrum watermark configured for embedding in a higher-frequency non-overlapping bandwidth using a subband decomposition path;

determining a second watermark score of the segment of the digital audio file for a second watermark using a second key, the second key derived from the excitation signal, and a watermark energy of the second watermark is below the psychoacoustic strength factor, wherein the second watermark is band-limited to a second bandwidth, and wherein the second bandwidth does not overlap with the first bandwidth, using LPC synthesis, the second watermark comprising a self-correlated watermark configured for embedding in a lower-frequency non-overlapping bandwidth using a discrete cosine transform (DCT) path;

based on at least the first watermark score and the second watermark score, determining a probability that the digital audio file is watermarked; and based on at least determining the probability that the digital audio file is watermarked, generating a report indicating whether the digital audio file is watermarked.

10. The one or more computer storage devices of claim 9, wherein the first bandwidth has a lower frequency limit above 5 kilohertz (KHz) and the second bandwidth has an upper frequency limit below 5 KHz.

11. The one or more computer storage devices of claim 9, wherein the operations further comprise:

determining a third watermark score of a third watermark using a third key, wherein the third watermark is band-limited to a third bandwidth, wherein the third bandwidth does overlap with the first bandwidth or the second bandwidth and wherein determining the probability that the digital audio file is watermarked comprises, based on at least the first watermark score, the second watermark score, and the third watermark score, determining the probability that the digital audio file is watermarked.

12. The one or more computer storage devices of claim 9, wherein the operations further comprise:

generating the first watermark using the first key;

generating the second watermark using the second key;

embedding the first watermark into the segment of the digital audio file; and embedding the second watermark into the segment of the digital audio file.

* * * * *